(12) United States Patent
Cogan et al.

(10) Patent No.: US 8,601,870 B2
(45) Date of Patent: Dec. 10, 2013

(54) MEASURING CUP

(76) Inventors: Jack Cogan, Rushville, MO (US); Brian Cogan, Rushville, MO (US)

( * ) Notice: Subject to any disclaimer, the term of this patent is extended or adjusted under 35 U.S.C. 154(b) by 228 days.

(21) Appl. No.: 13/308,790

(22) Filed: Dec. 1, 2011

(65) Prior Publication Data
US 2013/0139588 A1 Jun. 6, 2013

(51) Int. Cl.
*G01F 19/00* (2006.01)
(52) U.S. Cl.
USPC .......................................................... 73/426
(58) Field of Classification Search
USPC .......................................................... 73/426
See application file for complete search history.

(56) References Cited

U.S. PATENT DOCUMENTS

| | | | | |
|---|---|---|---|---|
| 3,258,177 A * | 6/1966 | Ellis | .................. | 222/455 |
| 4,802,597 A | 2/1989 | Dubach | | |
| 5,784,953 A * | 7/1998 | Wang | .................. | 99/499 |
| 6,698,275 B2 * | 3/2004 | Hall | .................. | 73/54.28 |
| 7,753,206 B2 * | 7/2010 | Sawhney et al. | .................. | 206/514 |
| 7,968,033 B2 * | 6/2011 | Mazzarolo | .................. | 264/274 |
| 8,474,368 B2 * | 7/2013 | Kilber et al. | .................. | 99/295 |
| 2002/0108953 A1 | 8/2002 | Goralnik | | |
| 2006/0131349 A1 | 6/2006 | Kaas | | |

OTHER PUBLICATIONS

Pyrex Accents 4-Cup Measuring Cup with Lid, Jun. 18, 2011, Google Products web site search.
Pourfect The Original Spill-Proof Bowl, Mar. 5, 2012, Internet screen shot.

\* cited by examiner

*Primary Examiner* — J M Saint Surin
(74) *Attorney, Agent, or Firm* — Dentons US LLP; Stephen J. Higgins

(57) ABSTRACT

A preferred embodiment of the present invention is an improved measuring cup comprising a straight transfer edge for facilitating transfer of dry materials from a flat surface into the cup as well as a rounded segment and spout for pouring wet materials out of the cup. The cup further includes one or more sets of volume indicia which may permit measurement of solids or liquids or both.

7 Claims, 2 Drawing Sheets

MEASURING CUP

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE

Not Applicable.

BACKGROUND OF THE INVENTION

1. Field of the Invention

The present invention pertains to measuring cups. The invention more particularly concerns an improved measuring cup for transferring dry materials across an interface between the cup and another surface.

2. Discussion of the Background

Measuring cups have been in use for well over a century. These measuring cups employ graduated markings or predetermined container volumes to introduce a level of precision and reproducibility to culinary and similar endeavors requiring volumetric measurement. Prior to the development of measuring cups, more inconsistent methods were used for measurement, for example "eye-balling" the materials or comparing their volume to various common articles, e.g., "fingers."

Since their inception, measuring cups have been designed for use with either wet materials (e.g., liquids) or solids. This bifurcation originally resulted from the tendency of solid masses to "settle" or otherwise present an inconsistent volume, whereas wet materials generally do not experience appreciable levels of volumetric variability for a given mass and, when static, present a substantially uniform open-air surface with which to compare volume indicia on the cup. In addition, wet materials are "poured" and may be subject to applicable surface flow fluid dynamics principles whereas solids are scooped or "dumped". As a result, measuring cup designs have developed as described herein to ease handling of wet or dry ingredients, respectively, according to their varying physical properties and behavior.

Wet measuring cups have developed to include features for pouring, most commonly spouts. Variations on existing wet cups have included wings, flares, partial tops, and spouts of varying shapes used to combat splashing or spillage resulting from pouring the fluid and/or from shifting ice which aggregates on the surface of fluid in some applications. Wet measuring cups also tend to use volume indicia, such as marks visible on the exterior surface of the cups, which are offset below their rims so as to avoid the need to fill the wet material to the rim for measurement, which would increase the risk of spillage.

Dry cups, in contrast, tend to utilize their rims as volume indicia, such that a preparer—knowing for example that a volume of "1 cup" is measured at the cup's rim—will commonly fill the cup with solids to or above its rim, and will subsequently level the solids with a straight edge to the level of the rim to measure volume. The solids are scooped or dumped into a dry measuring cup for measurement, which usually requires a transferring vessel (such as a spoon) which adds preparation and/or cleanup time, elevation of a mobile cutting surface (such as a cutting board) above the measuring cup and subsequent haphazard dumping of the solids into the measuring cup, or placing the measuring cup beneath a cutting surface's edge and pushing the solids into the cup. These processes often result in solids ending up on the floor or other undesirable surface because they missed the cup, or in added time and effort required to repeatedly push or scoop small amounts of solid into the cup.

Wet and dry cups have thus developed independently from one another, and any one cup is traditionally limited to use with either wet materials or solids. Further, existing measuring cups have generally only been used for measuring and, in some applications, as a container for the materials during heating.

There is thus a need for an improved measuring cup providing for easier transfer of solids to the measuring cup, as well as for improved utility in a wider variety of applications.

BRIEF SUMMARY OF THE INVENTION

In one form of the invention the device comprises a measuring cup having a wall, a bottom, and a rim defining the cup's open end. The rim is further comprised of a substantially straight transfer edge which may be positioned along a substantially flat surface, and which provides an interface along which solids may be transferred from the substantially flat surface into the measuring cup.

In another form of the invention the device comprises a measuring cup having a wall, a bottom, and a rim defining the cup's open end. The rim is further comprised of a substantially straight transfer edge which may be positioned along a substantially flat surface, and which provides an interface along which solids may be transferred from the substantially flat surface into the measuring cup. The device further comprises a wet material pouring spout which, in a preferred embodiment, is substantially opposite from the transfer edge of the rim.

In still yet another form of the invention the device comprises a measuring cup having a wall, a bottom, and a rim defining the cup's open end. The rim is further comprised of a substantially straight transfer edge which may be positioned along a substantially flat surface, and which provides an interface along which solids may be transferred from the substantially flat surface into the measuring cup. The device further comprises a wet material pouring spout which, in a preferred embodiment, is substantially opposite from the transfer edge of the rim and a storage lid positioned adjacent the open end of the measuring cup and which is associated with the interior and/or exterior surface of the wall and/or the cup's rim.

The foregoing are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims. A more complete appreciation of the invention and many of the advantages thereof will be readily obtained as the same becomes better understood by references to the detailed description when considered in connection with the accompanying drawings, wherein:

DETAILED DESCRIPTION OF THE INVENTION

As required, one or more detailed embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
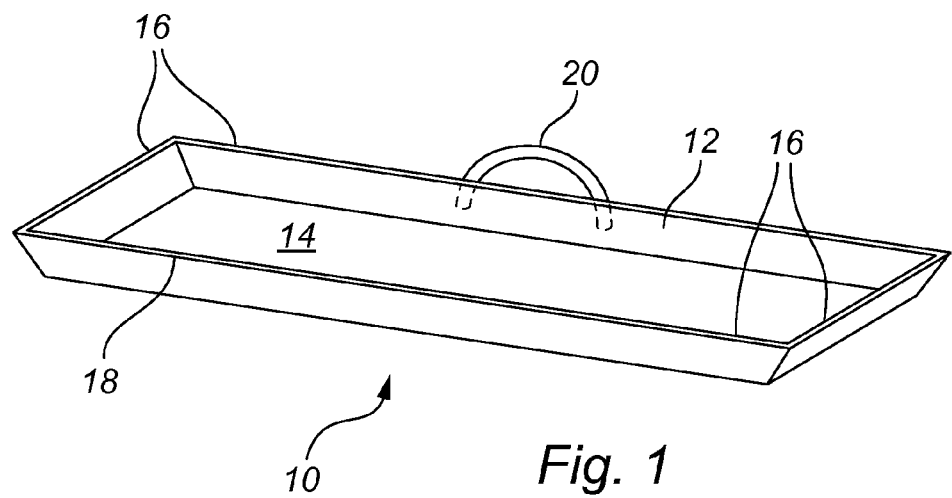
FIG. 1 is an elevated side view of an embodiment of the invention comprising a measuring cup having a wall shaped as a pyramid section, a bottom, a rectangular rim having a straight transfer edge associated with a long segment of the wall, and a grip fixed to the exterior of an opposing long segment of the wall.
Figure 2:
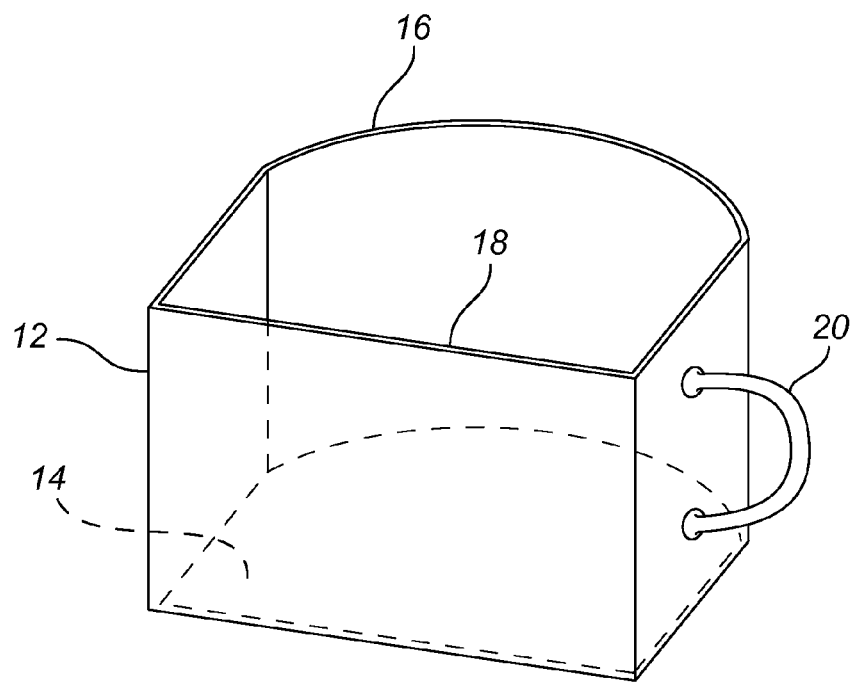
FIG. 2 is an elevated side view of another embodiment of the invention comprising a measuring cup having a wall with substantially planar and rounded segments, a bottom, a rim having a straight transfer edge and a rounded portion, and a grip fixed to the exterior of the rounded wall segment between the substantially planar wall segment and the opposing apex of the rounded wall segment.
Figure 3:
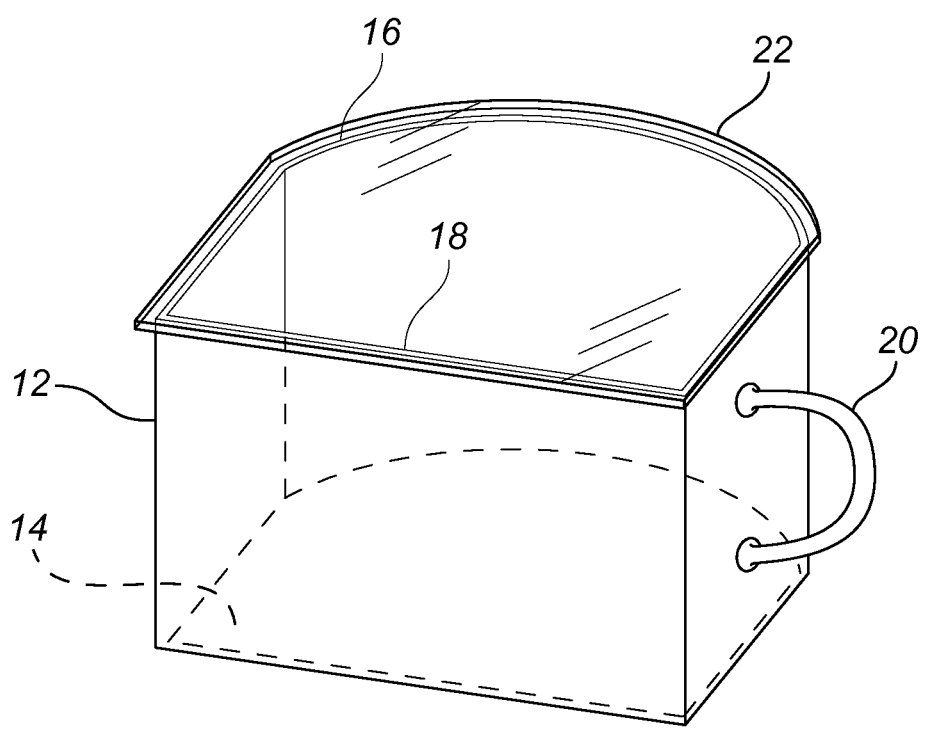
FIG. 3 is an elevated side view of another embodiment of the invention comprising a measuring cup having a wall with planar and rounded segments, a bottom, a rim having a straight transfer edge and a rounded portion, a grip fixed to the exterior of the rounded wall segment between the substantially planar wall segment and the opposing apex of the rounded wall segment, and a storage lid positioned adjacent the open end of the cup and associated with the exterior surface of the rounded wall segment.

Referring now to FIGS. 1-3, wherein like reference numerals designate identical or corresponding parts through the several views, an embodiment of the present invention is displayed therein.

FIG. 1 depicts a first embodiment of the invention comprising a measuring cup 10 having a wall 12 shaped as a pyramid section (four wall segments sloping at similar angles from a larger rectangular end toward a smaller rectangular end, as shown in FIG. 1) and having interior and exterior surfaces. The cup 10 further comprises a substantially planar bottom 14 on its closed end. Opposite the bottom 14, and defining the open end of the measuring cup 10, is the rim 16 which, in this embodiment, forms the shape of a rectangle. The rim 16 shown in FIG. 1 is comprised of two longer segments and two shorter segments. The rim 16 further comprises a transfer edge 18 along one of its longer segments. Opposite the transfer edge 18 and fixed to the exterior surface of the wall 12 is a grip 20.

The embodiment of FIG. 1 is a preferred embodiment of a dry measuring cup 10 having a generous transfer edge 18 in addition to shorter rim 16 segments which help facilitate dumping the solids out of the measuring cup 10 after measurement has been achieved. In operation, the preparer grasps the grip 20, lifts the grip 20 such that the transfer edge 18 is deelevated to a level adjacent a substantially flat surface—often a cutting board—where the solids sit. With the transfer edge 18 substantially flush against the flat surface, a knife or similar utensil (or even the hand) may be used to push the solids from the flat surface, across the transfer edge 18, and into the measuring cup 10.

Also, the angle between the wall 12 and the bottom 14 of the embodiment of FIG. 1 may be manipulated to increase the range of angles the cup 10 may be held at relative to the flat surface during transfer of materials. The greater the angle between the bottom 14 and the wall 12, up to 180 degrees, generally the greater the range of motion enjoyed by the measuring cup 10 relative to the flat surface. Lowering the grip 20 relative to the flat surface during use encourages solids which are being pushed into the measuring cup 10 to move further into the cup 10 and away from the transfer edge 18, which makes room for more solids along the transfer edge 18. Similarly, elevating the grip 20 will urge the solids back toward the transfer edge 18 and perhaps even across it onto the flat surface.

The wall 12 may also be comprised of an angled receiving surface (not shown) associated with the transfer edge 18 to further facilitate transfer of dry materials across the transfer edge 18 when scooping or pushing dry materials into the cup 10.

Further, the grip 20 of FIG. 1 is on the wall 12 segment opposite the transfer edge 18, which allows a preparer to be in an optimal position to apply pressure on the transfer edge 18 to maintain its substantially flush position against the flat surface during transfer of the solids into the cup 10. Also, once the solids have been transferred into the cup 10, and measurement has occurred, for example using known methods and volumetric indicia, the grip 20 of the embodiment of FIG. 1 also allows the preparer, by for example rotating the wrist, to elevate a short segment of the rim 16 relative to the opposing short segment, thus urging the solids to dump over the lower short segment and out of the cup 10. To further facilitate dumping the solids from the cup 10, a preparer may use fingers or utensils to urge the solids over the short segment of the rim 16. Of course, the solids may also be dumped from the cup 10 over any of the other rim 16 segments as desired.

Another embodiment of the present invention comprises the embodiment of FIG. 1 without the grip 20 attached to its wall 12 segment. Such an embodiment would more easily allow the cup 10 to be stacked with additional cups 10, which may provide for easier storage. Preparers may grasp the cup 10 of such an embodiment at any number of surfaces during use, including by squeezing the exterior surfaces of opposing wall 12 segments.

The cup 10 may be comprised of any number of solid materials such as glass, plastic, or metals. The embodiment of FIG. 1 is comprised of copper or copper alloy, metals with antimicrobial properties which are desirable for use in the food-related embodiment of FIG. 1. Further, the cup's 10 grip 20 may take any of a number of shapes without departing from the spirit of the invention, such as a substantially planar flange or roughly that of a horseshoe as depicted in FIGS. 1-3.

FIG. 2 depicts another embodiment of the invention which provides for dual use of the measuring cup 10 with wet and dry materials. It comprises a wall 12 with exterior and interior surfaces and having planar and rounded segments, a bottom 14, a rim 16 having a straight transfer edge 18 associated with the planar wall 12 segment and a rounded segment associated with the rounded wall 12 segment, and a grip 20 fixed to the exterior surface of the rounded wall 12 segment between the planar wall 12 segment and the opposing "apex" of the rounded wall 12 segment.

The embodiment of FIG. 2 broadens the utility of existing measuring cups by allowing for use with wet and dry materials. The preferred embodiment is comprised of glass or other known transparent material allowing for comparison of volume indicia on the cup 10 with the "level" or top surface presented by the cup's 10 contents.

This embodiment's straight transfer edge 18 is shown associated with a planar segment of the wall 12. By laying the cup 10 on its side and placing the transfer edge 18 adjacent to a flat surface such as a cutting board, the preparer may scoop or push dry materials across the transfer edge 18 and into the cup 10. Once an appropriate amount of dry materials is placed in the cup 10, the preparer may either compare the level or height of the materials against volumetric indicia located on the cup 10 along its wall 12, or against the rim 16 of the cup 10 as in traditional dry material measurement. If the former is chosen, these indicia may be in addition to any wet markings and may optionally be located along the height of the wall 12 by taking into account density variations common among dry materials (due to "settling" or simply to the size and shape of the constituent pieces of dry material which may result in pockets of unoccupied space between them sometimes referred to as "packing efficiency") without departing from the spirit of the invention. Likewise, if the latter is chosen, the overall volume of the cup may be similarly adjusted to compensate for density variations common among dry materials.

The embodiment of FIG. 2 also comprises a rim 16 with a rounded segment associated with the rounded segment of the wall 12. In other embodiments (not shown), the rounded segment of the rim 16 may further comprise a spout located opposite the transfer edge 18 which helps facilitate pouring of wet materials from the cup 10. The location of the spout need not be opposite the transfer edge 18, it may be located elsewhere along the rounded segment of the rim 16 without departing from the spirit of the invention.

In operation with wet materials, the cup 10 is filled with said materials to a desired level or height, whether that level is judged by comparison with volumetric indicia appearing on the wall 12 of the cup 10 or its rim 16. If the indicia appear on the wall 12, they may be located along the wall 12 according to an assumption of consistent density of wet materials. Said indicia may be in addition to other, dry material indicia which may also appear on the cup 10 of an embodiment of the invention. Once measurement has been achieved, the wet materials may be poured from the cup 10 over its rim 16, and preferably across a spout (not shown).

FIG. 3 shows another embodiment of the embodiment of FIG. 2 which further comprises a lid 22 for substantial sealing against the cup 10. This embodiment increases utility of the cup 10 by enhancing its ability to further serve as a container for material storage. The lid 22 may be comprised of glass, plastic, or other materials suitable for use in such applications. It may be fixed to the cup 10 by a hinge, flexible flange, or similar structure which allows the lid 22 to be applied and removed from the cup's 10 rim 16 while remaining attached to the cup 10. Alternatively, the lid 22 may attach via friction fit or may otherwise be removable from the cup 10 without permanent or semi-permanent affixation thereto. It may also contact interior or exterior surfaces of the wall 12, the rim 16, or portions thereof, in sealing thereagainst.

These and other uses of, and modifications to, the present invention will be apparent to those of skill in the art upon reading this disclosure.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall there between.

What is claimed is:

1. A measuring cup, comprising:
   a wall;
   a bottom associated with the wall and defining a substantially closed end of the measuring cup; and
   a rim associated with the wall and defining an open end of the measuring cup,
   wherein,
      the rim further comprises a substantially straight transfer edge,
      the wall substantially forms the shape of a pyramid section,
      the rim and the bottom are substantially rectangular,
      the measuring cup further comprises a grip attached to an exterior surface of the wall,
      the rim further comprises two longer and two shorter segments, and
      the grip is attached to the exterior surface of one longer segment of the wall and the transfer edge is associated with an opposing longer segment of the wall.

2. A measuring cup, comprising:
   a wall;
   a bottom associated with the wall and defining a substantially closed end of the measuring cup; and
   a rim associated with the wall and defining an open end of the measuring cup,
   wherein,
      the rim further comprises a substantially straight transfer edge,
      the wall further comprises a substantially planar segment and a rounded segment, and
      the rim further comprises a rounded segment extending from the transfer edge.

3. The measuring cup of claim 2, further comprising a grip attached to an exterior surface of the wall.

4. The measuring cup of claim 3, wherein the grip is attached between the planar segment of the wall and the apex of the rounded segment of the wall.

5. The measuring cup of claim 2, wherein the planar segment of the wall further comprises an angled receiving surface associated with the transfer edge.

6. The measuring cup of claim 2, further comprising a lid for substantially sealing the open end of the measuring cup.

7. The measuring cup of claim 6, wherein the lid is movably attached to the measuring cup.

* * * * *